United States Patent [19]
Oshima

[11] 3,865,327
[45] Feb. 11, 1975

[54] FILM CARTRIDGE

[75] Inventor: Shigeru Oshima, Tokyo, Japan

[73] Assignee: Fuji Photo Film Co. Ltd., Kanagawa, Japan

[22] Filed: Oct. 24, 1973

[21] Appl. No.: 409,119

[30] Foreign Application Priority Data
Oct. 27, 1972  Japan.............................. 47-107782

[52] U.S. Cl. .............................................. 242/71.2
[51] Int. Cl. ............................................. G03b 1/04
[58] Field of Search ........... 242/71.2, 71.1; 354/212

[56] References Cited
UNITED STATES PATENTS

| | | | |
|---|---|---|---|
| 1,738,838 | 12/1929 | Matthews............................ | 242/71.2 |
| 2,173,996 | 9/1939 | Becker................................ | 242/71.2 |
| 2,257,424 | 9/1941 | Meyer............................ | 242/71.2 X |
| 2,319,530 | 5/1943 | Bolsey............................ | 242/71.2 X |

*Primary Examiner*—Edward J. McCarthy
*Attorney, Agent, or Firm*—Sughrue, Rothwell, Mion, Zinn & MacPeak

[57] ABSTRACT

A film cartridge for a photographic camera comprising a film feed-out chamber from which a rolled film is supplied, a film receiving chamber into which the film supplied from said feed-out chamber is fed, and an intermediate connection member connecting and extending between said chambers in front of the film between the chambers, said intermediate connection member being provided with a groove through which an end of a claw engaging a perforation of the film moves.

3 Claims, 7 Drawing Figures

PATENTED FEB 11 1975　　3,865,327
SHEET 1 OF 2
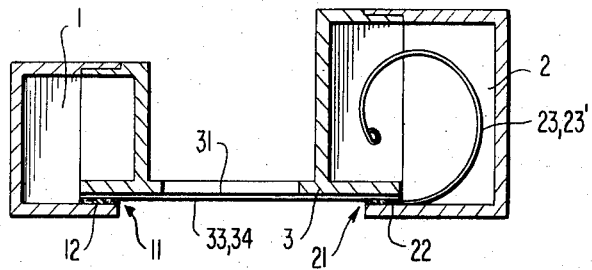
FIG. 1
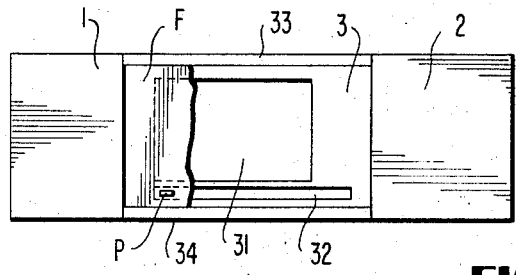
FIG. 2
FIG. 3
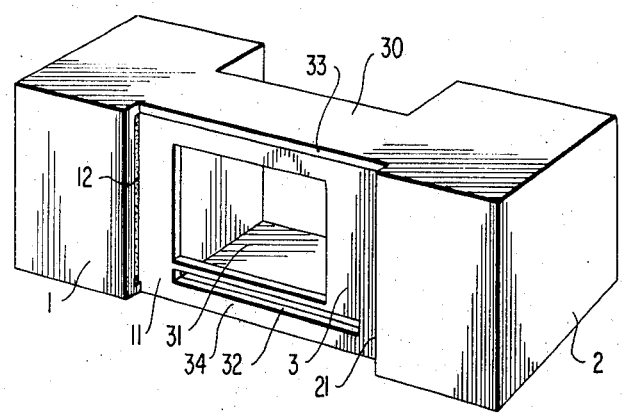

FILM CARTRIDGE

BACKGROUND OF THE INVENTION

1. Field of the Invention

This invention relates to a film cartridge, and more particularly to a photographic film cartridge of a small size and of simple construction.

2. Description of the Prior Art

A photographic film cartridge adapted to be loaded in a camera comprising a pair of film chambers and an intermediate connection member connected between the pair of film chambers is known in the art. In this type of film cartridge, a film takeup shaft for taking up the exposed film is rotatably provided in the film chamber into which the exposed film is fed.

Further in most of these types of film cartridges, the intermediate connection member covers the entire backside and the upper and lower portions of the front side of the film passing therethrough.

The film is fed by the take-up shaft until a perforation comes into engagement with a claw in the camera.

In the above-described type of the conventional film cartridge, however, the mechanism in the camera to feed the film is complicated since the film take-up and the film feed stop means are separately produced. In addition, the cartridge of this type must have a hole for a connection between the take-up shaft in the cartridge and a take-up mechanism in the camera, and accordingly there is a need for shielding the film from light around the hole to prevent undesirable exposure of the film when the cartridge is removed from the camera in the light.

In addition, since the intermediate connection member constitutes a tunnel passage for passing the film, the position of the film surface in the camera is not stable with respect to the optical system in the camera.

In view of the above-described defects inherent in the conventional film cartridge, a primary object of this invention is to provide a film cartridge of simple construction adapted to be loaded into photographic camera.

Another object of the present invention is to provide a film cartridge which dose not require a complicated mechanism in the camera for feeding the film therein.

Still another object of the present invention is to provide a film cartridge which does not have a hole requiring means for shielding the film from light passing therethrough.

A further object of the present invention is to provide a film cartridge in which the film loaded therein is precisely positioned in the focal plane of the camera.

A still further object of the present invention is to provide a film cartridge in which the film is securely fed by a claw in the camera.

A still further object of the present invention is to provide a film cartridge which can be loaded in a simple compact camera which is sold together with the film cartridge and in which the film cartridge can be interchanged in the light.

These and other objects, features and advantages of the present invention will be made apparent from the following detailed description of a preferred embodiment thereof taken in conjunction with the accompanying drawings.

SUMMARY OF THE INVENTION

This invention in its broad aspect provides a film cartridge for a photographic camera comprising a film feed-out chamber and a film receiving chamber from which and into which a photographic film is fed and received. The two chambers are connected by an intermediate connection member extending between the two chambers with the intermediate connection member having a groove through which an end of a claw engaging a perforation of the film is moved.

BRIEF DESCRIPTION OF THE ACCOMPANYING DRAWINGS

FIG. 1 is a horizontal cross sectional view of a film cartridge in accordance with the present invention.

FIG. 2 is a rear view of the film cartridge as shown in FIG. 1.

FIG. 3 is a perspective view taken from the rear of the film cartridge of this invention.

DETAILED DESCRIPTION OF PREFERRED EMBODIMENTS

Figure 4:
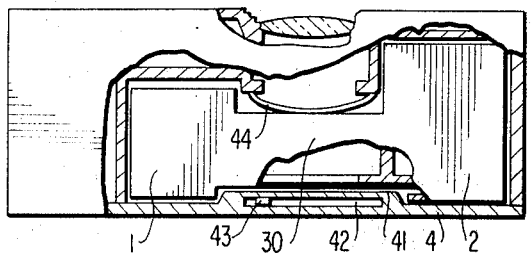
FIGS. 4 and 5 are partial horizontal sectional views of the film cartridge loaded in the camera which show the internal construction of the film cartridge and the camera in accordance with the present invention.

Now referring to FIGS. 1 to 3 showing an embodiment of the film cartridge in accordance with this invention, an unexposed film chamber 1 and an exposed film chamber 2 are connected with an intermediate connection member 3, which can all be made of plastic.

The intermediate connection member 3 is reinforced with a reinforcing plate 30 which is fixed to the member 3 at a right angle therewith at the upper portion thereof and extends between both of the chambers 1 and 2. In this cartridge, an unexposed film F having no backing paper is taken out of the chamber 1 at the outlet 11 thereof and fed along the intermediate connection member 3 and pushed into the exposed film chamber 2 through an inlet 21 thereof. The photosensitive emulsion surface of the film F faces the connection member 3. At the outlet 11 and the inlet 21 of the chambers 1 and 2 are provided light shielding cloth pieces 12 and 22 as shown in FIG. 1. The connection member 3 is provided with an aperture 31 of a rectangular shape through which a light image passes and impinges on the emulsion surface of the film.

A groove 32 is provided along the lower edge of the aperture 31 on the member 3 as shown in FIG. 2. The film F is provided with perforations P along the lower side edge of the film.

When the film cartridge is loaded in the camera, a claw for feeding the film engages the perforation P from the backside of the film. The film is fed by the movement of the claw means in the groove 32 due to the engagement of the claw with the perforation P of the film F. When the claw moves in the groove from left to right in FIGS. 1 to 3, the film F is fed by one frame and the exposed film is pushed into the exposed film chamber 2.

In order to assure the feeding of the film by the claw, the top end of the claw moves in the groove 32. At the upper and lower ends of the connection member 3 are provided protrusions 33 and 34 extending from the chamber 1 to the chamber 2.

The film F is guided along the upper and lower protrusions 33 and 34 so that the film may not move up and down when it is fed along the connection member 3. In the exposed film chamber 2 are provided soft springs 23 and 23' for guiding the film F to roll it in a convolution in the exposed film chamber 2.

The soft springs 23 and 23' contact the upper and lower marginal parts of the film F and roll up the film as described above as the film is fed into the chamber 2.

If the above-described cartridge is loaded in the camera, the film F passes between the connection member 3 and a back cover of the camera or a pressure plate of the camera since the film is exposed behind the connection member 3. Since the photosensitive emulsion surface of the film is pressed against rear surface of the connection member 3 of the cartridge, the focal plane of the camera is set at the rear surface of the member 3.

Figure 5:
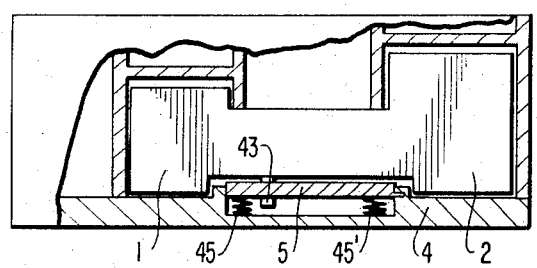

FIGS. 4 and 5 show the film cartridge in accordance with this invention loaded in a camera. FIG. 4 shows the film cartridge and the camera partly in section respectively in which a plateau portion 41 is provided on the back cover 4 of the camera.

In the hollow portion 42 of the plateau portion 41 is provided a lever 43 which drives the film feed claw which in turn extends through the perforation of the film F from the backside of the film. The plateau 41 comes into contact with the protrusions 33 and 34 on the back of the cartridge when the cartridge is loaded into the camera to form a film passage behind the cartridge to pass the film therethrough. At the part in the camera where the front face of the reinforcing plate 30 faces a spring 44 for stably holding the cartridge in the camera is provided.

FIG. 5 shows the main portion of the camera in section in which a pressure plate 5 is provided on the back cover 4 of the camera by way of springs 45 and 45'. The film F is pushed against the connection plate 3 by the pressure plate 5, and accordingly a sharp image can be focussed on the film F which is accurately positioned at the back surface of the cartridge.

Figure 6:
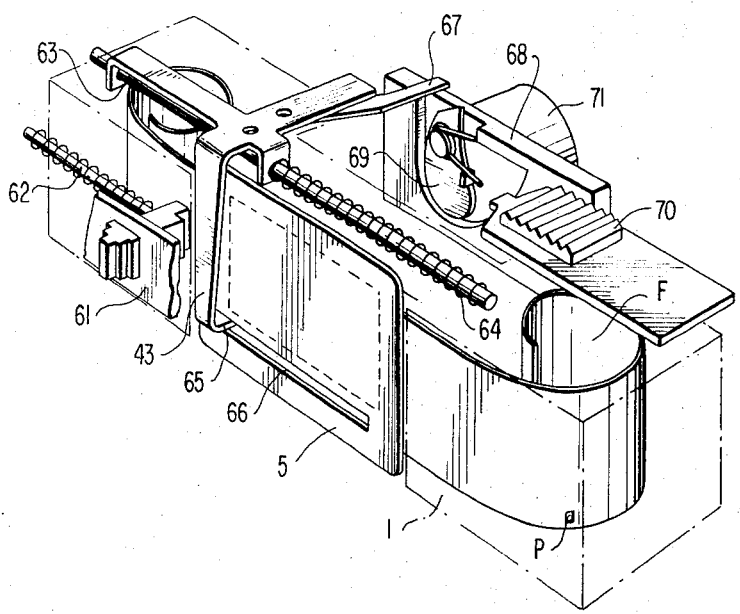
FIG. 6 is perspective view showing the internal construction of the film feeding mechanism in the camera using the film cartridge in accordance with this invention.

One example of a mechanism for feeding the film in the film cartridge in accordance with the present invention will now be described with reference to FIG. 6. In FIG. 6, the film F and the film feed mechanism are illustrated using solid lines and the film cartridge is shown using dotted lines. A film feed lever 61 is provided on the back of the camera and is movable back and forth along a rail groove provided in the camera back cover (not shown). The film feed lever 61 is urged to the left by means of a coil spring 62. When the film feed lever 61 is moved to the right overcoming the spring force of the spring 62, the lever 43 in the back cover is moved to the right along the rail 63 overcoming the spring force of a compression coil spring 64. An end of the lever 43 serves as a claw 65 extending through a slit 66 provided at the lower end of the pressure plate 5 and is engaged with a perforation P of the film F to feed the film F.

Therefore, by making the length of the slit 66 of the pressure plate 5 equal to or slightly longer than the interval between the perforations of the film, the film F can be fed to the right by one frame. At this time, a plate spring 67 provided at the other end of the lever 43 is moved to the right along the upper end of a shutter block 68. A shutter blade 69 is urged to rotate clockwise by means of a shutter blade and prevented from complete rotation by a recess molded in the shutter block 68, so that the plate spring 67 rises up a ramp at the top end of the shutter blade 69 and moves over the shutter blade 69 to the right when the lever 43 is moved to the right. The plate spring 67 works to urge the lever 43 in the counterclockwise direction around the rail 63. That is, the lever 43 is urged so that the claw 65 may not be disengaged from the perforation of the film F.

When the film feed lever 61 is moved to the right by one frame length, a part of the lever 43 where the spring 67 is mounted is positioned under the shutter button 70 of the camera.

When the finger used to move the film feed lever 61 in manual operation is removed, the film feed lever 61 moves back to the original leftmost position due to the tension of the coil spring 62. However, the lever 43 is held in its position with the claw 65 engaged with a perforation of the film since the spring force of the compression coil spring 64 is small.

Thus, the wind up of the film is completed and the shutter is cocked. If the shutter button 70 is depressed after the shutter is cocked, the lever 43 is rotated clockwise overcoming the spring 64 by the depression of the shutter button 70 and the claw 65 is disengaged from the perforation P of the film F.

The lever 43 is returned to the left by the compression spring 64 and on the return to the left of the lever 43 the plate spring 67 strikes the top end portion of the shutter blade 69 and rotates the blade 69 counterclockwise. The light image passing through the lens 71 impinges on the surface of the film F through an aperture provided in the shutter block which has up until this time been closed by the shutter blade 69. The shutter blade 69 due to the shutter spring quickly closes the aperture after being opened. On the way back to the left of the lever 43 due to the force of the coil spring 64, the claw 65 comes into contact with the lower part of the film F and the film F is stopped when the claw 65 engages the next perforation. The film cartridge in accordance with the present invention is adapted to be used in a camera having a construction as described above. In the embodiment shown in FIG. 6, it is necessary that the claw 65 be engaged with the perforation P of the film F and the film F stops at the wound up position overcoming the force of the spring 64 when the film is wound up. However, from a practical stand point, there is the fear that the claw 65 will be disengaged from the perforation of the film or the film will be moved in the opposite direction by vibration of the camera or the like.

Figure 7:
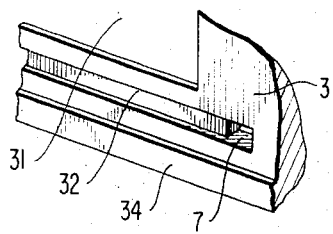
FIG. 7 is a perspective view showing a certain portion of the cartridge in accordance with this invention.

In order to prevent such a difficulty, it is preferred that the groove 32 in which the end of the claw moves is provided with a deep recess 7 at the rightmost end thereof as shown in FIG. 7 to hold the claw 65 therein. By providing a recess 7 at the end of the groove 32, the claw 65 is engaged with the recess when the claw 65 is brought to the rightmost position and accordingly, the claw 65 will not return to the left even if there is vibration in the camera. In order that the emulsion surface (photosensitive surface) of the film not directly contact the connection member 3 rails may be provided on the connection member above and below the aperture 31 thereof to regulate the focussing plane of the film.

The plateau portion of the back cover of the camera or the pressure plate can be made to abut the protrusions guiding the side edges of the film and form a tunnel passage for the film between the connection member and the pressure plate or the plateau.

Alternatively, the plateau or the pressure plate can be mated with the space formed between the protrusions on the connection member to press the film against connection member.

Further, as shown in the camera illustrated in FIG. 6, where the film is fed by engagement of the perforation and the claw only at the lower portion of the film, the upper portion of the film may be loosely fed with the lower portion of the film fed in tight contact with the film cartridge and the camera.

Further, it is desirable that the outlet 11 of the chamber 1 and the inlet 21 of the chamber 2 faced each other with space as shown in FIG. 1 there between in order to obtain a sharp image by maintaining the film flat. By so constructing the film cartridge, the film can easily be put into contact with the backside of the connection member. With this construction, the rear wall constituting a part of the film chambers forms the film inlet and outlet between the connection member and the wall and the rear wall projects toward the backside of the connection member. In other words, the back side of the connection plate becomes a mating recess with respect to the rear wall of the camera. The pressure plate 5 of the camera as shown in FIG. 5 or the plateau 41 of the back cover of the camera as shown in FIG. 4 corresponding to the space between the rear walls of the camera has the effect of firmly holding the film cartridge in the camera. Therefore, the cartridge is effectively prevented from vibrating in the camera even by vibration of the camera or an external force exerted on the camera for instance when the film is fed.

While the invention has been described in detail and with reference to specific embodiments thereof, it will be apparent to one skilled in the art that various changes and modifications can be made therein without departing from the spirit and scope thereof.

What is claimed is:

1. In a film cartridge containing photographic film having perforations adjacent at least one edge for a photographic camera having a film advancement mechanism in which a movable claw engages the perforations in the film, said cartridge having a film feed-out chamber from which said photographic film is supplied, and a film receiving chamber into which the film supplied from said feed-out chamber is fed, the improvements comprising: an intermediate connection member connecting and extending between said chambers in front of the film, said intermediate connection member being provided with a groove through which an end of the claw engaging a perforation of the film moves and a separate aperature to allow light to pass therethrough and impinge on said photographic film, said groove and said aperture being located on the same side of said film.

2. A film cartridge as defined in claim 1 wherein the rear surface of the intermediate connection member extends out of alignment with the rear surface of said chambers and a recess is formed on the back side of said intermediate connection of said cartridge between the chambers.

3. A film cartridge as defined in claim 1 wherein said groove is provided with a deeper recess at the end on the film receiving chamber side thereof.

* * * * *